(12) United States Patent
Brostom

(10) Patent No.: US 6,728,098 B1
(45) Date of Patent: Apr. 27, 2004

(54) PANEL MOUNTABLE ELECTRONIC DEVICE

(75) Inventor: John P. Brostom, Firestone, CO (US)

(73) Assignee: Opnext, Inc., Fremont, CA (US)

( * ) Notice: Subject to any disclaimer, the term of this patent is extended or adjusted under 35 U.S.C. 154(b) by 0 days.

(21) Appl. No.: 10/066,048

(22) Filed: Jan. 31, 2002

(51) Int. Cl.[7] .................................................. H02B 1/00
(52) U.S. Cl. ........................ 361/600; 361/679; 361/683; 361/732; 312/215; 312/216; 312/223.2
(58) Field of Search ................................. 361/683, 687, 361/688, 685, 725–727, 740, 759, 801, 616; 312/332.1, 333, 223.1, 223.2; 174/67, 52.1; 292/240, 101, 710, 113

(56) References Cited

U.S. PATENT DOCUMENTS

| | | | | |
|---|---|---|---|---|
| 599,154 A | * | 2/1898 | Taylor | 292/197 |
| 1,498,965 A | * | 6/1924 | Prentice | 271/98 |
| 3,929,360 A | * | 12/1975 | Gulistan | 292/67 |
| 4,131,970 A | * | 1/1979 | Le Van | 16/270 |
| 4,856,295 A | * | 8/1989 | Bolton et al. | 62/263 |
| 5,311,397 A | * | 5/1994 | Harshberger et al. | 361/683 |
| 5,600,542 A | * | 2/1997 | Malgouires | 361/732 |
| 5,630,632 A | * | 5/1997 | Swan | 292/240 |
| 5,691,879 A | * | 11/1997 | Lopez et al. | 312/219 |
| 5,887,916 A | * | 3/1999 | Finkelstein et al. | 292/241 |
| 5,927,766 A | * | 7/1999 | Rosen | 292/101 |
| 6,097,592 A | * | 8/2000 | Seo et al. | 361/683 |
| 6,116,660 A | * | 9/2000 | Langkamp et al. | 292/65 |
| 6,216,339 B1 | * | 4/2001 | Rich | 29/267 |
| 6,231,145 B1 | * | 5/2001 | Liu | 312/223.2 |
| 6,357,804 B1 | * | 3/2002 | Bernier et al. | 292/114 |
| 6,377,694 B1 | * | 4/2002 | von Rijsbergen | 381/86 |
| 6,422,399 B1 | * | 7/2002 | Castillo et al. | 211/26 |

* cited by examiner

*Primary Examiner*—Boris Chervinsky
(74) *Attorney, Agent, or Firm*—Finnegan, Henderson, Farabow, Garrett & Dunner, LLP

(57) ABSTRACT

A panel mountable electronic device includes a housing having a flange through which passes a hole, a tab having a threaded hole, and a screw. In some embodiments, the electronic device is an optical transceiver and includes optical as well as electronic connections. The disclosed electronic device may be mounted to a panel by inserting the screw through the hole in the flange and into the threaded hole in the tab, inserting a portion of the housing through an opening in the panel, and rotating the screw to rotate the tab into position to clamp a portion of the panel between the tab and the flange. The screw may be further rotated to draw the tab toward the flange and thereby adjust the contact pressure between the flange and the panel.

18 Claims, 6 Drawing Sheets

PANEL MOUNTABLE ELECTRONIC DEVICE

FIELD OF THE INVENTION

The present invention relates generally to panel mountable electronic devices, and more particularly to optical transceivers that efficiently utilize space.

BACKGROUND

Optical transmission of data over optical fiber is a common method used for telecommunications and data communications. In this method, optical transceivers translate electrical signals into optical signals, and vice versa.

In many optical communications applications one or more optical transceivers are mounted in a chassis that may be installed in a relay rack or a cabinet having an industry standard width. Typically, an optical transceiver must be secured to the chassis with sufficient pressure to maintain good electrical contact between the optical transceiver's housing and the chassis in order to minimize radiated emissions from the transceiver to the ambient environment. In one conventional mounting method, an optical transceiver is inserted through an opening in the chassis front panel and then secured to the panel with screws that pass through untapped holes in the optical transceiver's housing and engage threaded holes in the chassis panel. This is a general method applied to many types of panel mounted electronic devices.

One problem with this and similar conventional methods for mounting electronic devices in a chassis is that they require extra holes or openings in the chassis panel to accommodate fasteners. These extra holes take up space on the panel and thus limit how closely two or more electronic devices (e.g., optical transceivers) may be mounted in the same chassis. This may be particularly significant for optical communications applications in which it is desired to maximize the number of devices per chassis.

Another problem with these conventional panel mounting methods is that threaded holes or other fastener components incorporated into a chassis may be easily damaged and may be inconvenient to repair. For example, screws may break off in threaded holes in the chassis, or the threaded holes may be stripped. In either situation, repair of the chassis might require removing the entire chassis and all devices installed in it from service. Such an interruption in service might be a significant problem in optical communications applications, for example.

Therefore, there is a need for an improved means of panel mounting optical transceivers and other electronic devices.

SUMMARY

A panel mountable electronic device includes a housing having a flange through which passes a hole, a tab having a threaded hole, and a screw. The term "screw" is used herein to denote threaded fasteners including but not limited to conventional screws or bolts. In some embodiments, the electronic device is an optical transceiver and includes optical as well as electrical connections.

The disclosed electronic device may be mounted to a panel by inserting the screw through the hole in the flange and into the threaded hole in the tab, inserting a portion of the housing through an opening in the panel, and rotating the screw to rotate the tab into position to clamp a portion of the panel between the tab and the flange. The screw may be further rotated to draw the tab toward the flange and thereby adjust the contact pressure between the flange and the panel.

In some embodiments, the housing includes a recess into which the tab may fit. The screw may be rotated in one direction to rotate the tab into the recess and thus allow the housing to be inserted through the opening in the panel, and later rotated in the other direction to position the tab for clamping a portion of the panel between the tab and the flange.

Of course, more than one hole may pass through the flange, and the device may include more than one threaded tab, more than one screw, and more than one recess utilized as described above.

In some embodiments, two or more of the disclosed panel mountable electronic devices may be mounted in a chassis or other enclosure more closely than is typical for conventional panel mounted devices. This may be advantageous in optical communication applications, for example. In addition, the disclosed method of mounting electronic devices to a panel may simplify the design of the chassis or other enclosure in which the devices are mounted, and reduce the risk of damaging the chassis or other enclosure when installing or removing the devices.

BRIEF DESCRIPTION OF THE DRAWINGS

It should be noted that the dimensions in the figures are not necessarily to scale. Like reference numbers in the various figures denote like parts in the various embodiments.

DETAILED DESCRIPTION

Disclosed herein are electronic devices that may be mounted to a panel using screws and threaded tabs. These electronic devices may be, for example, optical transceivers.

Figure 1:
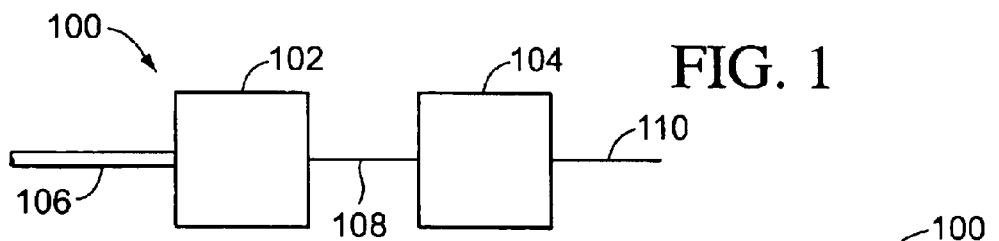
FIG. 1 is a block diagram of an optical transceiver in accordance with an embodiment.

FIG. 1 shows a block diagram of an embodiment of an optical transceiver 100 that includes a detector/source 102 and a driver 104. Optical fiber 106 provides optical data signals to or receives optical data signals from detector/source 102. When optical transceiver 100 functions as an optical receiver, detector/source 102 detects light received via optical fiber 106. Optical signals detected by detector/source 102 are translated into electrical signals which are then transmitted electrically via electrical conductors 108 to driver 104. Driver 104 drives the output electrical signals through electrical conductors 110 to, for example, another device in a telecommunications or data communications system. When optical transceiver 100 functions as an optical transmitter, electrical signals are provided through electrical conductors 110 to driver 104. Driver 104 drives source/detector 102 to emit corresponding optical signals which are coupled into and transmitted over optical fiber 106.

Figure 2A:
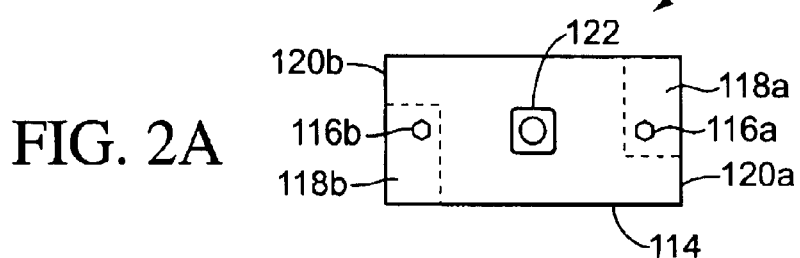
FIGS. 2A–2D are, respectively, front, side, side, and top views of an optical transceiver in accordance with an embodiment.
Figure 2B:
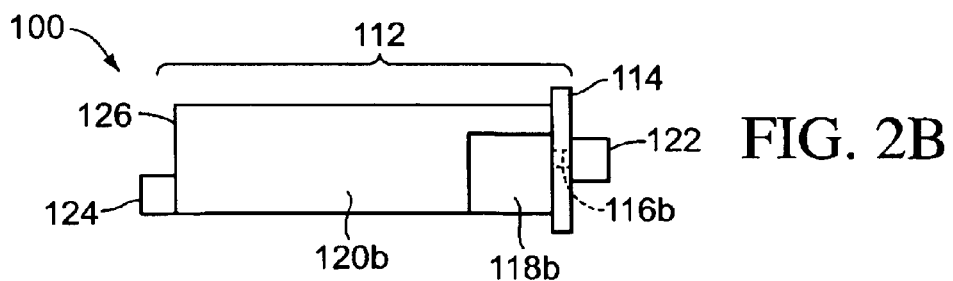
Figure 2C:
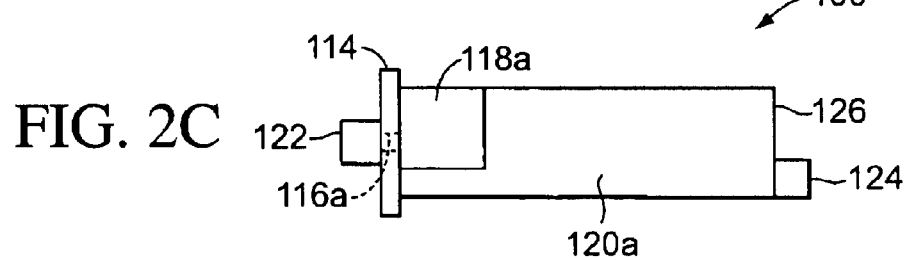
Figure 2D:
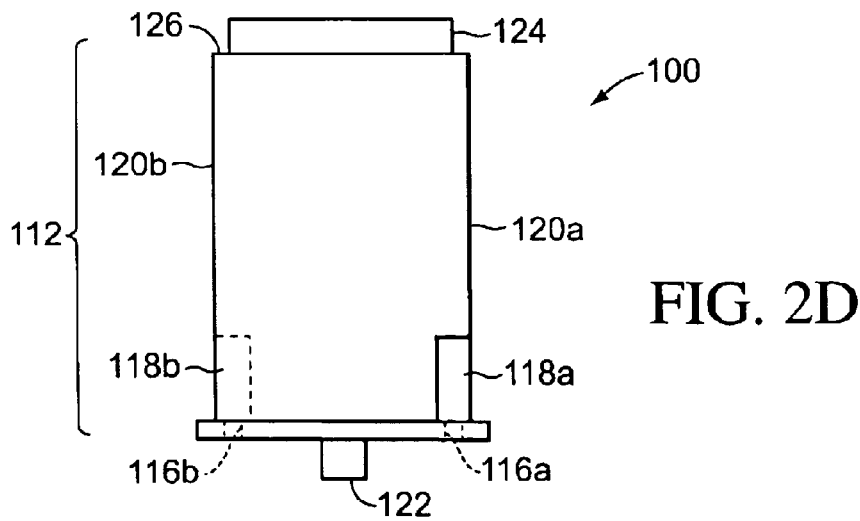

In one embodiment (FIGS. 2A–2D), optical transceiver 100 includes a housing 112 (not shown in FIG. 2A) within which detector/source 102, driver 104, (FIG. 1) and other components of optical transceiver 100 may be housed. In the illustrated implementation, housing 112 includes a flange 114 through which pass through-holes 116a and 116b. Housing 112 also includes recesses 118a and 118b formed, respectively, in sides 120a and 120b of housing 112 and in communication, respectively, with through-holes 116a and 116b. As discussed below, threaded tabs may be positioned in the recesses, threaded onto screws inserted through the through-holes, and used to mount optical transceiver 100 to a panel.

In this embodiment optical transceiver 100 also includes an optical fiber connector 122 disposed on flange 114 and an electrical connector 124 disposed on a back side 126 of housing 112. Optical fiber connector 122 and electrical connector 124 may be used to couple optical transceiver 100 to optical fibers and electrical conductors as indicated in FIG. 1. One of ordinary skill in the art will recognize that a wide variety of commercially available optical fiber connectors and electrical connectors may be suitable for use, respectively, as optical fiber connector 122 and electrical connector 124. Other embodiments may include more than one optical fiber connector and more than one electrical connector.

In one implementation, housing 112 is formed from a material having a high heat conductivity, such as a metal, to aid dissipation of heat generated by optical transceiver 100. Suitable metals for housing 112 include but are not limited to aluminum, zinc, and stainless steel. In other implementations, particularly those not requiring substantial heat dissipation, housing 112 may be formed from a plastic.

Although FIGS. 2A–2D show optical transceiver 100 including two recesses in housing 112, other embodiments may include more or fewer recesses. Some embodiments may include no recesses. Also, although recesses 118a and 118b are shown as having particular shapes and particular locations in housing 112, other shapes and other locations allowing optical transceiver 100 to be mounted to a panel using threaded tabs may also be used. Other embodiments may also include more or fewer through-holes in flange 114.

Figure 3A:
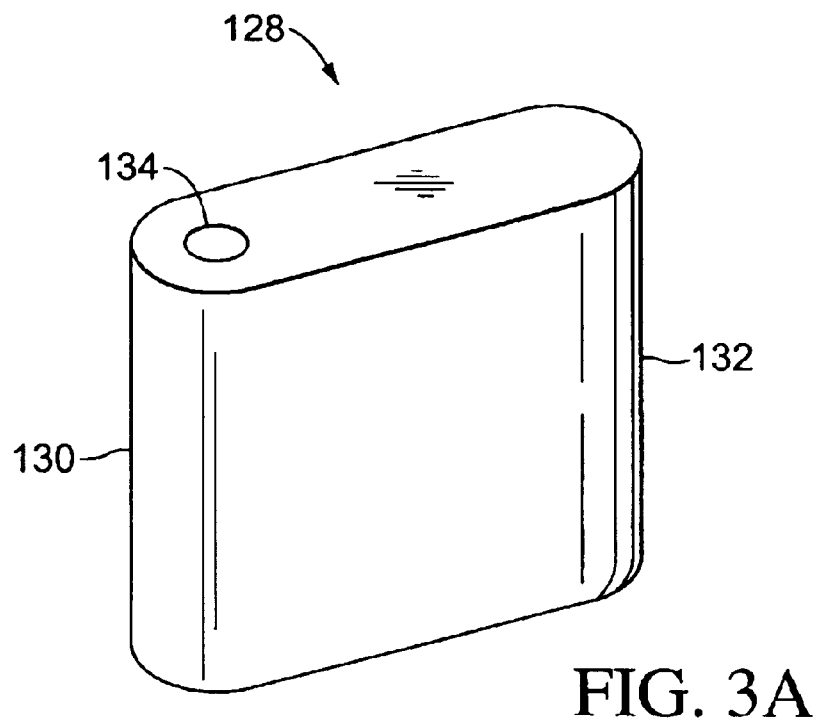
FIGS. 3A and 3B are perspective views of tabs used in panel mounting an optical transceiver in accordance with embodiments.

Optical transceiver 100 may be mounted to a panel of a chassis or other enclosure with the use of one or more screws and one or more threaded tabs. In some embodiments, for example, optical transceiver 100 includes threaded tab 128 shown in FIG. 3A. Tab 128 is a plate including a threaded hole 134 oriented substantially parallel to two rounded edges 130 and 132. Threaded hole 134 may pass either partially or entirely through tab 128. Although FIG. 3A shows threaded hole 134 off center in tab 128, in other embodiments threaded hole 134 may be more symmetrically placed (e.g., centered) in tab 128. The size and shape of tab 128 may be chosen such that tab 128 may fit partially or entirely into one of recesses 118a and 118b (FIGS. 2A–2D) in housing 112 with threaded hole 134 substantially aligned with one of through-holes 116a and 116b.

Figure 3B:
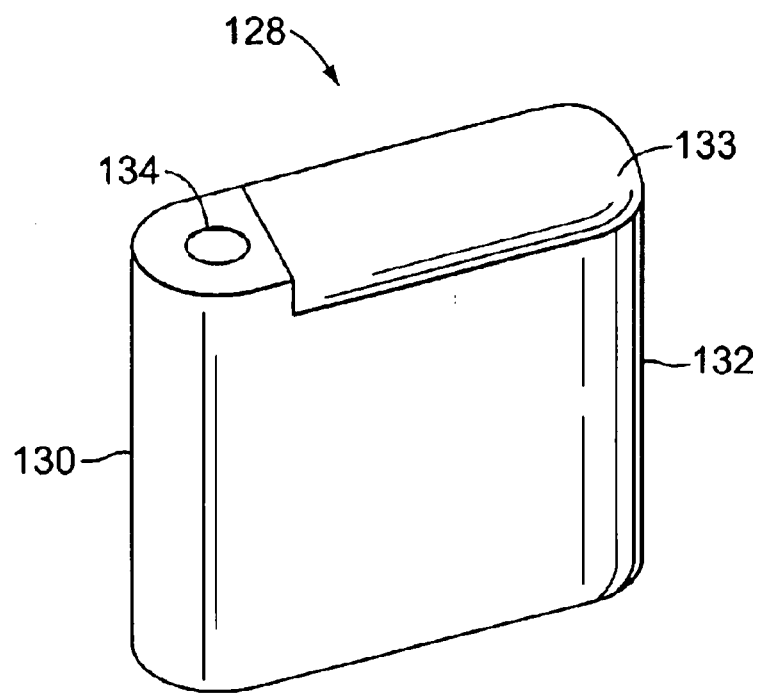

In one implementation, tab 128 is formed from a metal. In other implementations, tab 128 may be formed from a plastic. Although tab 128 is shown as having a particular shape, in other embodiments optical transceiver 100 includes tabs having other shapes allowing optical transceiver 100 to be mounted to a panel. Such tabs need not be plate-like and need not have rounded edges. For example, tabs having rod or beam shapes may be used. In one embodiment (FIG. 3B), tab 128 has an angled surface 133. Tabs having "L" shapes may also be used.

Figure 4:
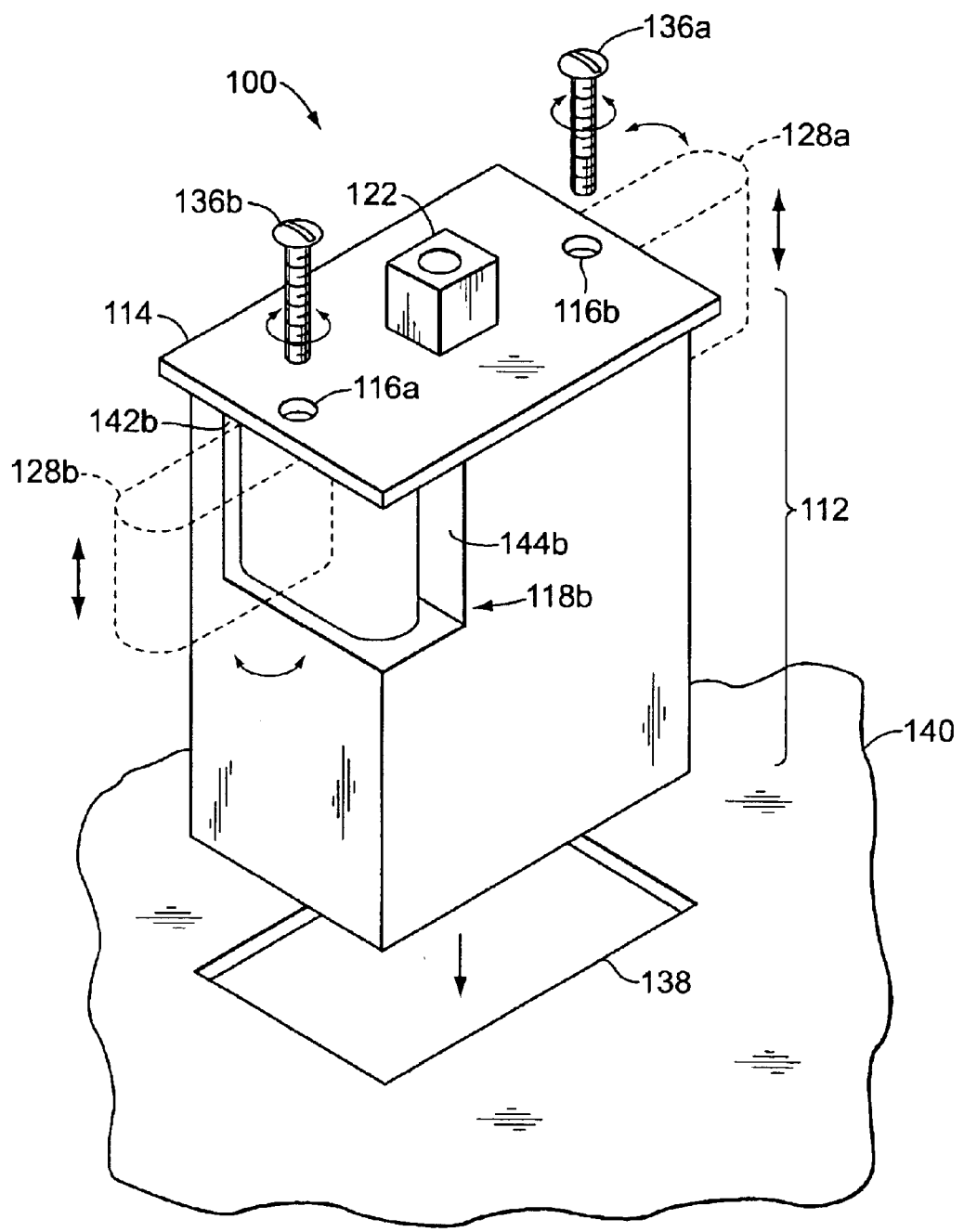
FIG. 4 is a perspective view showing the optical transceiver of FIGS. 2A–2D being mounted to a chassis panel in accordance with an embodiment.
Figure 5:
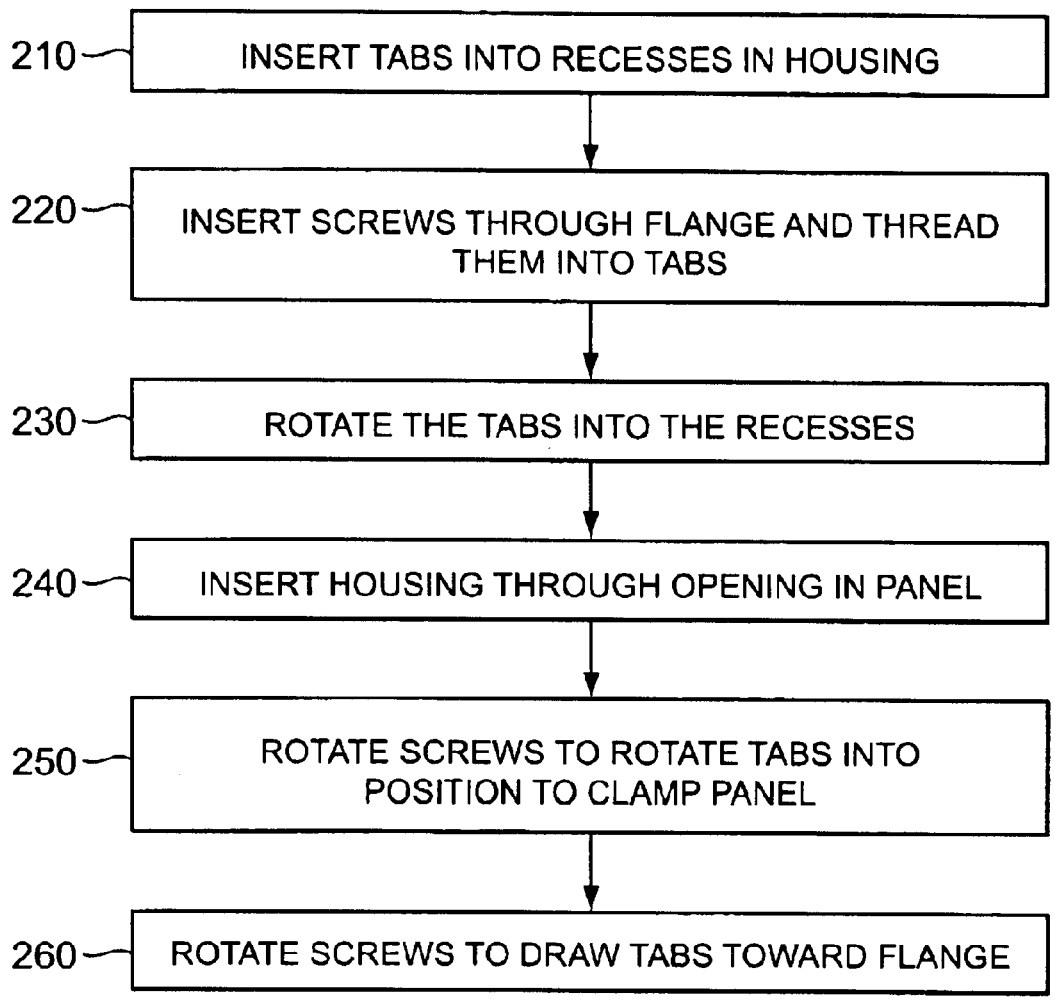
FIG. 5 is a flow chart of a method for mounting an electronic device to a panel in accordance with an embodiment.

One method (method 200) by which the embodiment of optical transceiver 100 shown in FIGS. 2A–2D may be mounted to a chassis panel, for example, may be understood with reference to the illustration in FIG. 4 and to the flow chart in FIG. 5. In step 210 of this method, tabs 128a and 128b (both similar to tab 128 of FIG. 3, for example) are inserted, respectively, into recesses 118a and 118b in housing 112. Next, in step 220, screws 136a and 136b are inserted, respectively, through through-holes 116a and 116b and engaged, respectively, in the threaded holes of tabs 128a and 128b. Screws 136a and 136b are not fully tightened at this point. Hence, friction between the threads on the screws and the threads in the tabs allows the tabs to be oriented with respect to housing 112 by rotating the screws.

After step 220, in step 230, screws 136a and 136b are rotated to rotate the tabs into their respective recesses (in FIG. 4, a counterclockwise rotation) to thus allow insertion of housing 112 into opening 138 in chassis panel 140. The position of tab 128b at this point is indicated by its solid line representation. Next, in step 240, housing 112 is inserted into opening 138 until flange 114 is flush with panel 140. (Typically, opening 138 is larger than but substantially the same shape as the body of housing 112, and smaller than flange 114.)

Following step 240, in step 250 screws 136a and 136b are rotated to rotate the tabs 128a and 128b into positions in which they protrude from housing 112 (in FIG. 4, a clockwise rotation) and are located on the opposite side of panel 140 from flange 114. This rotation of the tabs may be over a range of about 90 degrees, for example, and may be limited or stopped by contact between the tabs and portions of housing 112 or portions of the chassis. For example, in the illustrated embodiment the angular range over which tab 128b may be rotated may be limited by side walls 142b and 144b of recess 118b. The positions of tabs 128a and 128b at this point are indicated by their dashed line representations. In these positions, tabs 128a and 128b may be used to clamp panel 140 between the tabs and flange 114.

Next, in step 260, screws 136a and 136b are rotated to draw tabs 128a and 128b toward flange 114 (in FIG. 4, a clockwise rotation), clamp panel 140 between the tabs and the flange, and thereby secure optical transceiver 100 to panel 140. Contact pressure between flange 114 and panel 140 may be set and maintained by the torque applied to screws 136a and 136b.

Other embodiments of optical transceiver 100 may be mounted to a panel by methods similar to that of method 200. Such embodiments include those disclosed in U.S. Patent Application Ser. No. 10/051,429, assigned to the assignee of the present invention and incorporated herein by reference in its entirety. In some embodiments, some of the steps of method 200 listed in FIG. 5 may be skipped or modified and other steps may be added. For embodiments lacking recesses in housing 112, for example, step 210 would be skipped. In such embodiments the tabs could not be rotated into recesses, but would still be rotated (in step 230) into position to allow insertion of the housing into an opening in the panel. In some embodiments steps 250 and 260 may be combined. In embodiments utilizing tabs such as tab 128 shown in FIG. 3B, angled surface 133 allows the tab to supply increasing pressure to the chassis panel as the tab is turned. In such embodiments, for example, step 260 may be omitted.

Figure 6:
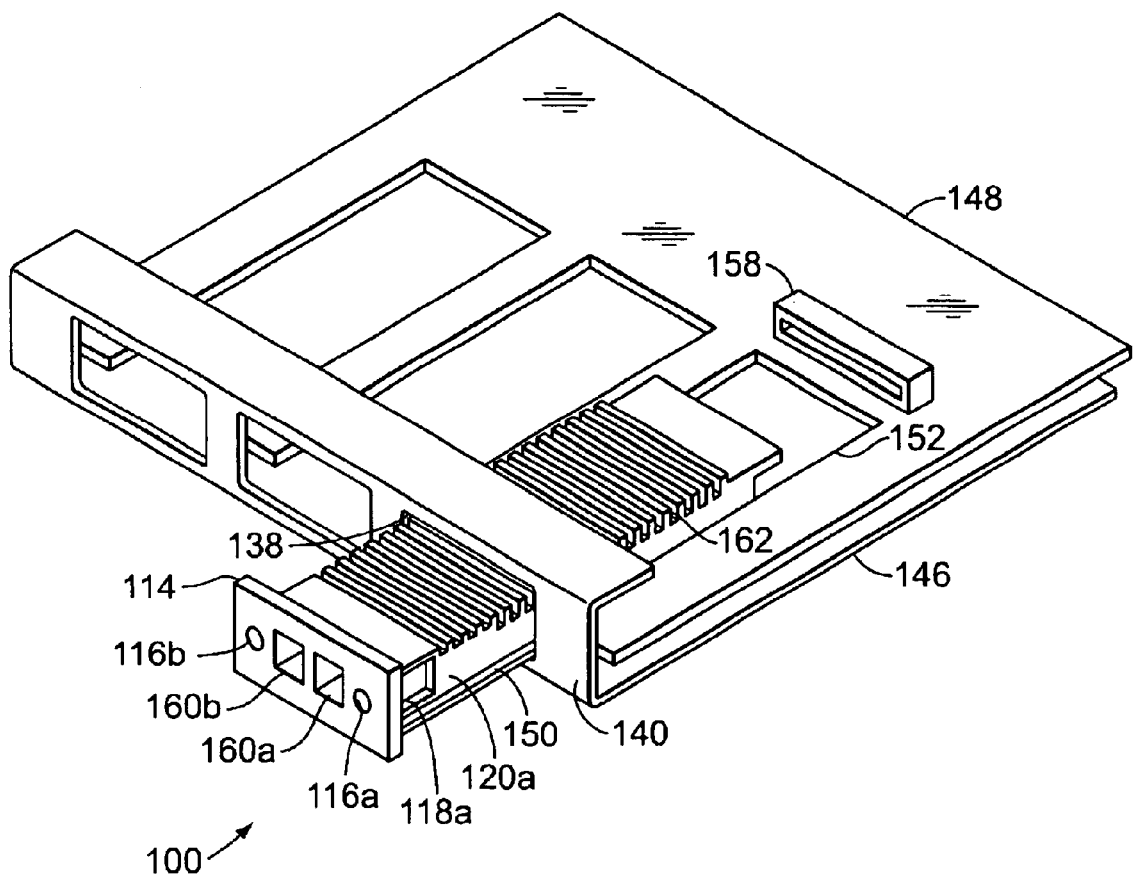
FIG. 6 is a perspective view of an optical transceiver in accordance with another embodiment partially inserted into a chassis.
Figure 7:
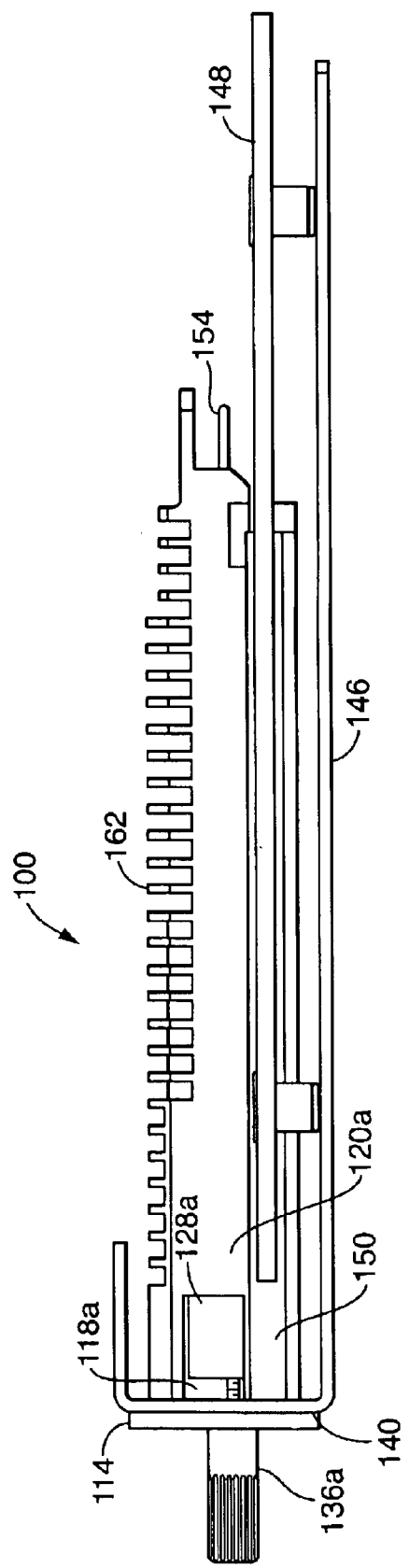
FIG. 7 is a side view of the optical transceiver of FIG. 6 inserted into a chassis.

In FIG. 6, another embodiment of optical transceiver 100 is shown partially inserted through opening 138 in front panel 140 of chassis 146, and partially mounted to a printed circuit board 148 installed in chassis 146. FIG. 7 shows a side view of the optical transceiver of FIG. 6 fully inserted into chassis 146 and mounted to printed circuit board 148. In this embodiment, optical transceiver 100 includes a notch 150 formed in side 120a of housing 112. A similar notch is located on side 120b of housing 112, but is not visible in FIGS. 6 and 7. Notch 150 is located such that it slidably engages an edge 152 of printed circuit board 148 as optical transceiver 100 is inserted into chassis 146. Notch 150 and edge 152 form part of a notch and rail system that help secure optical transceiver. 100 in chassis 146. Tab 128a is shown in FIG. 7 rotated into recess 118a to allow optical transceiver 100 to be inserted through opening 138 in panel 140. As described above, screw 136a may be rotated to rotate tab 128a into position behind panel 140 and to draw tab 128a toward flange 114, thereby clamping panel 140 between flange 114 and tab 128a.

In the embodiment illustrated in FIGS. 6 and 7, optical transceiver 100 includes a printed circuit board 154 (FIG. 7) that protrudes from the back of housing 112. Printed circuit board 154 may dock in conventional card edge connector 158 (FIG. 6) located on printed circuit board 148 to allow electrical signals to be delivered to and received from optical transceiver 100 via electrically conductive traces in printed circuit board 148. Optical signals may be delivered to or received from optical transceiver 100 via optical fibers connected to fiber optic receptacles 160a and 160b. Receptacles 160a and 160b may be duplex SC fiber optic receptacles, for example.

Optical transceiver 100 shown in FIGS. 6 and 7 also includes a finned heat sink 162 to aid dissipation of heat generated during operation of optical transceiver 100. Heat sink 162 may be formed, for example, from metals including but not limited to aluminum and zinc. Heat sink 162, notch 150, and protruding circuit board 154 shown in FIGS. 6 and 7 are all optional features of optical transceiver 100, and need not be present in all embodiments.

Although the illustrated embodiments are described as optical transceivers, in other embodiments other types of electronic devices may be mounted to a panel using threaded tabs in a manner similar to that shown in the figures and described above. Such electronic devices may include, for example, electrical transceivers, electrical or optical connectors, connector bulkheads, and cooling devices.

The panel mountable electronic devices disclosed herein may provide numerous advantages compared to conventional panel mounted devices. For example, the disclosed devices do not require any additional holes or openings in the panel to accommodate fasteners. Consequently, the disclosed devices may be mounted closer to each other than is typically the case for conventional panel mounted devices. This allows the number of devices mounted in a single chassis to be advantageously increased or the size of the chassis to be reduced. In one embodiment, for example, eight optical transceivers are mounted side by side in a chassis having only approximately 14 inches of width available.

Another advantage of the disclosed devices is that they may be mounted in a chassis, for example, without the use of threads, clips, nuts, or other mechanisms incorporated into the chassis front panel or elsewhere in the chassis. This reduces the risk of damaging the chassis when installing or removing the devices. In addition, fabrication of the chassis front panel is simplified since, for example, fewer openings in the panel are required.

While the present invention is illustrated with particular embodiments, the invention is intended to include all variations and modifications falling within the scope of the appended claims.

I claim:

1. A panel mountable electronic device, said device comprising:

a housing including a flange through which passes a hole;

a tab having a threaded hole; and a screw;

wherein said screw may be passed through said hole in said flange and engaged in said threaded hole such that a rotation of said screw rotates said tab into position to clamp a portion of said panel between said tab and said flange, and wherein further rotation of said screw forcibly clamps a portion of said panel between said tab and said flange.

2. The electronic device of claim 1, wherein said housing is formed from a metal.

3. The electronic device of claim 1, wherein said housing is formed from a plastic.

4. The electronic device of claim 1, wherein said housing includes a heat sink.

5. The electronic device of claim 1, wherein said housing includes a recess into which said tab fits.

6. The electronic device of claim 5, wherein said tab may be rotated into said recess by rotation of said screw.

7. The electronic device of claim 1, wherein a portion of said housing limits rotation of said tab to a range of about 90 degrees.

8. The electronic device of claim 1, wherein said threaded hole is located off center in said tab.

9. The electronic device of claim 1, wherein said electronic device is an optical transceiver and further comprises at least one optical fiber connector.

10. The electronic device of claim 1, further comprising a notch in said housing located to slidably engage an edge of a board.

11. A method of mounting an electronic device to a panel, said electronic device including a housing having a flange, said method comprising:

inserting a screw through a hole in said flange and into a threaded hole in a tab;

inserting a portion of said housing through an opening in said panel;

rotating said screw to rotate said tab into position to clamp a portion of said panel between said tab and said flange; and continuing rotation of said screw to forcibly clamp said portion of said panel between said tab and said flange.

12. The method of claim 11, further comprising rotating said screw to draw said tab toward said flange.

13. The method of claim 11, further comprising inserting said tab into a recess in said housing.

14. The method of claim 11, further comprising rotating said screw to rotate a portion of said tab out of a recess in said housing.

15. The method of claim 11, further comprising rotating said screw to rotate said tab into a position allowing insertion of said housing into said opening.

16. The method of claim 11, further comprising rotating said screw to rotate said tab in a range of about 90 degrees.

17. The method of claim 11, wherein said electronic device is an optical tranceiver comprising at least one optical fiber connector attached to said housing.

18. The method of claim 11, further comprising slidably engaging a notch in said housing with an edge of a board.

* * * * *

UNITED STATES PATENT AND TRADEMARK OFFICE
CERTIFICATE OF CORRECTION

PATENT NO. : 6,728,098 B1
DATED : April 27, 2004
INVENTOR(S) : John P. Brostrom

It is certified that error appears in the above-identified patent and that said Letters Patent is hereby corrected as shown below:

Title page,
Item [75], Inventors, change "Brostom" to -- Brostrom --;

Column 6,
Line 61, change "tranceiver" to -- transceiver --.

Signed and Sealed this

Nineteenth Day of April, 2005

JON W. DUDAS
*Director of the United States Patent and Trademark Office*